US010505801B2

(12) United States Patent
Tinney et al.

(10) Patent No.: US 10,505,801 B2
(45) Date of Patent: Dec. 10, 2019

(54) SYSTEM AND METHOD FOR IDENTIFYING AND RECOVERING STRANDED VOTING BALLOTS

(71) Applicant: Hart InterCivic Inc., Austin, TX (US)

(72) Inventors: Drew E. Tinney, Austin, TX (US); Steven J. Blachman, Pflugerville, TX (US); Robert J. Scheibler, Universal City, TX (US); Ievgen Konovalenko, Austin, TX (US)

(73) Assignee: Hart InterCivic, Inc., Austin, TX (US)

( * ) Notice: Subject to any disclaimer, the term of this patent is extended or adjusted under 35 U.S.C. 154(b) by 317 days.

(21) Appl. No.: 15/229,360

(22) Filed: Aug. 5, 2016

(65) Prior Publication Data
US 2017/0353349 A1 Dec. 7, 2017

Related U.S. Application Data

(60) Provisional application No. 62/356,676, filed on Jun. 30, 2016, provisional application No. 62/345,316, filed on Jun. 3, 2016.

(51) Int. Cl.
H04L 12/24 (2006.01)
G07C 13/02 (2006.01)

(52) U.S. Cl.
CPC .......... *H04L 41/0816* (2013.01); *G07C 13/02* (2013.01); *H04L 41/0681* (2013.01); *G06Q 2230/00* (2013.01); *H04L 2209/463* (2013.01)

(58) Field of Classification Search
CPC ............. H04L 41/0681; H04L 41/0816; H04L 2209/463; G06Q 2230/00; G07C 13/00; G07C 13/02
See application file for complete search history.

(56) References Cited

U.S. PATENT DOCUMENTS

| 5,278,753 | A | 1/1994 | Graft |
| 6,250,548 | B1 | 6/2001 | McClure et al. |
| 6,873,966 | B2 | 3/2005 | Babbitt et al. |
| 6,951,303 | B2 | 10/2005 | Peterson et al. |
| 7,032,821 | B2 | 4/2006 | McClure et al. |

(Continued)

FOREIGN PATENT DOCUMENTS

| EP | 1 291 826 | 12/2003 |
| WO | WO 2006/016928 | 2/2006 |

(Continued)

OTHER PUBLICATIONS

Epstein, Jeremy; "Electronic voting;" Computer 40.8 (2007); pp. 92-95.

(Continued)

Primary Examiner — Aaron N Strange
(74) Attorney, Agent, or Firm — Egan Peterman Enders Huston

(57) ABSTRACT

Techniques for configuring and operating a network connected election voting system are provided. Voting devices are network connected to a voting system controller. Alerts are provided when a ballot becomes stranded on a voting device. The stranded ballots may be untransferrable ballots or interrupted ballots. A recovery mechanism is provided to obtain the data for untransferrable ballots. The alerts may be provided at a display on the voting device, controller or both.

22 Claims, 3 Drawing Sheets

(56) References Cited

U.S. PATENT DOCUMENTS

| | | |
|---|---|---|
| 7,099,471 B2 | 9/2006 | Neff |
| 7,377,431 B2 | 5/2008 | Urken |
| 7,422,151 B2 | 9/2008 | Homewood et al. |
| 7,431,209 B2 * | 10/2008 | Chung .................. G07C 13/00 235/375 |
| 7,458,512 B2 | 12/2008 | Cohen et al. |
| 7,640,181 B2 | 12/2009 | McClure et al. |
| 8,061,589 B2 | 11/2011 | Cohen et al. |
| 8,201,738 B2 | 6/2012 | Hotto et al. |
| 8,843,389 B2 | 9/2014 | Kaplan et al. |
| 8,876,002 B2 | 11/2014 | Arnoa et al. |
| 2004/0093504 A1 | 5/2004 | Toshizaki |
| 2004/0238632 A1 * | 12/2004 | Homewood ........... G07C 13/00 235/386 |
| 2005/0211778 A1 | 9/2005 | Biddulph |
| 2009/0072032 A1 | 3/2009 | Cardone et al. |
| 2009/0089155 A1 | 4/2009 | Fein et al. |
| 2012/0053997 A1 * | 3/2012 | Garfinkle ............... G07C 13/00 705/12 |
| 2012/0248185 A1 * | 10/2012 | Contorer ................ G07C 13/00 235/386 |
| 2014/0207694 A1 * | 7/2014 | Vickery ............... G06C 30/018 705/317 |
| 2015/0012339 A1 * | 1/2015 | Onischuk ............... G07C 13/00 705/12 |
| 2015/0296562 A1 * | 10/2015 | Park .................. H04W 52/0245 370/252 |
| 2015/0356804 A1 * | 12/2015 | Mitchel .................. G07C 13/00 705/12 |

FOREIGN PATENT DOCUMENTS

| | | |
|---|---|---|
| WO | WO 2006/124894 | 11/2006 |
| WO | WO 2008/065349 | 6/2008 |

OTHER PUBLICATIONS

Farhi, Niko. An Implementation of Dual (Paper and Cryptograhic) Voting System. Diss. Tel Aviv University, 2013, 44 pp.

Norden, Lawrence D. The machinery of democracy: Protecting elections in an electronic world. Brennan Center for Justice at NYU School of Law, 2006; 162 pp.

Sastry et al., "Designing voting machines for verification." Proceedings of the 15thconference on USENIX Security Symposium—vol. 15, Berkeley, CA, USA, 2006. USENIX Association; 16 pp.

Torre et al. "Technological Solutions for Electronic Voting and Guarantees of the Integrity of the Electoral Process. A Case Study." (2013); 9 pp.

* cited by examiner

SYSTEM AND METHOD FOR IDENTIFYING AND RECOVERING STRANDED VOTING BALLOTS

This application claims priority to Provisional Patent Application No. 62/345,316 filed Jun. 3, 2016 and to Provisional Patent Application No. 62/356,676 filed Jun. 30, 2016, the disclosures of which are expressly incorporated herein by reference.

BACKGROUND OF THE INVENTION

The present disclosure relates to the voting systems for elections. More specifically, it provides a system and method for identifying and/or recovering stranded voting ballots.

A variety of electronic voting systems are well known. Such systems include, for example, paper ballot systems in which ballots are scanned for electronic tabulation, direct recording electronic (DRE) voting systems that record votes directly, and other electronic voting techniques. For at least some of these voting systems, locally networked voting systems have become popular. In some embodiments of networked voting systems, votes may be cast on multiple voting terminals and then accumulated on one or more other networked controller devices. If communication between a voting terminal and the controller fails, a ballot may be "stranded" upon the voting terminal. Prior art techniques typically involve a limited number of attempts to transfer a ballot from a voting terminal to a controller. If that attempt fails, user notification typically was not provided that a ballot was stranded. Stranded ballots could be detected by comparison of ballot counters on each networked voting terminal, or by visually comparing the ballot count on the controller device with the number of voters checked-in at the poll. Recovery of a stranded ballot could involve recovering all of the cast vote records (CVRs) stored on the voting terminals and analyzing the entire set of data. It would be desirable to provide improved communication and techniques for dealing with stranded ballots.

SUMMARY OF THE INVENTION

The present disclosure provides a technique for detecting the occurrence of a fault in the communication between a networked voting device and a voting network controller. The fault may occur for a number of reasons: loss of the network connection, power outages, a faulty "handshake" between the voting device and the controller, corrupted data or any number of other procedural, technical or mechanical problems. Such failures may result in a "stranded" ballot which was cast in the voting device but never recorded at the controller. Alternatively, the failure may result in a stranded ballot which occurs when the ballot processing is interrupted before the voter's vote has been cast. The disclosed concepts may include detecting and/or flagging the existence of stranded ballots. Further, the disclosed concepts may include providing a voting terminal that stores a local copy of ballots and allows for an alternative collection process and reporting of such stranded ballots. The disclosed concept may further include issuing a warning on the voting device and/or controller indicating the existence of the stranded ballot. In one embodiment, the concepts may include halting future voting on the voting terminal in question.

In one embodiment a method of configuring a network connected election voting system is provided. The method may comprise providing one or more voting devices configured to process a voter's ballot selections and providing at least one voting system controller, the voting system controller configured to be network connected to the voting devices. The method further includes configuring the network connected election voting system to detect the existence of a stranded ballot and configuring the network connected election voting system to provide an alert when a stranded ballot is detected, the election voting system being configured to provide the alert on at least one of the voting device, the controller or a central elections office device.

In another embodiment, an election voting system is provided. The system may comprise at least one voting device configured to process a voter's ballot selections and at least one controller, the controller network connected to voting devices. The election voting system includes the at least one voting device, the controller or both being configured to detect a stranded ballot at the at least one voting device. The election voting system further comprises the at least one voting device, the controller or both being configured to provide an alert in conjunction with the detection of the stranded ballot, the alert being configured to identify the existence of the stranded ballot.

In yet another embodiment, a method of controlling the work flow of an election process is provided. The method may comprise providing at least one voting device and a controller, the at least one voting device and the controller being configured to communicate via a network. The method further includes configuring the voting device and the controller to communicate ballot information containing data indicating a voter's election choices from the voting device to the controller over the network. The method also includes configuring the voting process to detect when the communication of ballot information containing data indicating a voter's election choice is not properly transmitted from the at least one voting device to the controller. The method further includes configuring the voting process to provide an alert in conjunction with the detection that the data indicating a voter's election choice has not been properly transmitted from the at least one voting device to the controller, the alert being provided on a screen of the at least one voting device, the controller or both. Finally, the method includes configuring the at least one voting device to halt further voting on the at least one voting device pending resolution of the alert.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

The present disclosure provides a technique for detecting the occurrence of a fault in the communication between a networked voting device and a voting network controller. The fault may occur for a number of reasons: loss of the network connection, power outages, a faulty "handshake" between the voting device and the controller, corrupted data or any number of other procedural, technical or mechanical problems. Such failures may result in a "stranded" ballot which was cast in the voting device but never recorded at the controller. Alternatively, the failure may result in a stranded ballot which occurs when the ballot processing is interrupted before the voter's vote has been cast. The disclosed concepts may include detecting and/or flagging the existence of stranded ballots. Further, the disclosed concepts may include providing a voting terminal that stores a local copy of ballots and allows for an alternative collection process and reporting of such stranded ballots. The disclosed concept may further include issuing a warning on the voting device and/or controller indicating the existence of the stranded ballot. In one embodiment, the concepts may include halting future voting on the voting terminal in question.

The techniques disclosed herein may be useful in a wide variety of networked voting systems, and those networks disclosed herein will be recognized as merely being exemplary. As such, the techniques will be recognized to be useful in a wide range of networked voting systems, and not only the exemplary networks shown and described herein.

Figure 1:
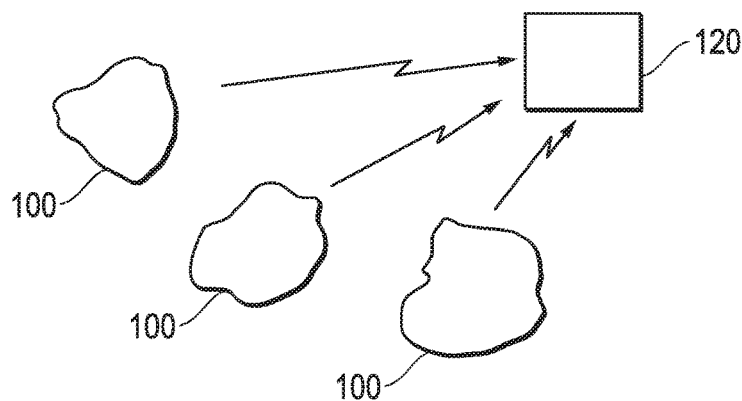
FIG. 1 illustrates exemplary voting networks in which the techniques disclosed herein may be utilized.

FIG. 1 illustrates at a high level one exemplary voting system. As shown in FIG. 1, a plurality of voting networks 100 are provided. Voting results from the voting networks 100 may be communicated to a central tabulation center 120. Communication from the networks 100 may occur in a wide variety of manners, included manual transmission (providing an "air gap" such as in the manual movement of data drives from the networks 100 to the central tabulation center 120), hardwire electronic transmission, wireless electronic transmission, etc. In the electronic transmission techniques, the central tabulation center 120 may be considered to be network connected to each of the voting networks 100.

The voting networks 100 may include a variety of voting devices arranged in a variety of manners. For example, the voting networks 100 may each be located at a voting precinct location in which one or more voting terminals are provided. The voting networks 100 may be similarly configured early voting locations. The voting networks 100 may also be a network of one or more ballot scanners located at a central elections office for processing paper ballots (for example absentee or mail in ballots). However, it will be recognized that many other voting networks may also be applicable to the techniques disclosed herein.

Figure 2A:
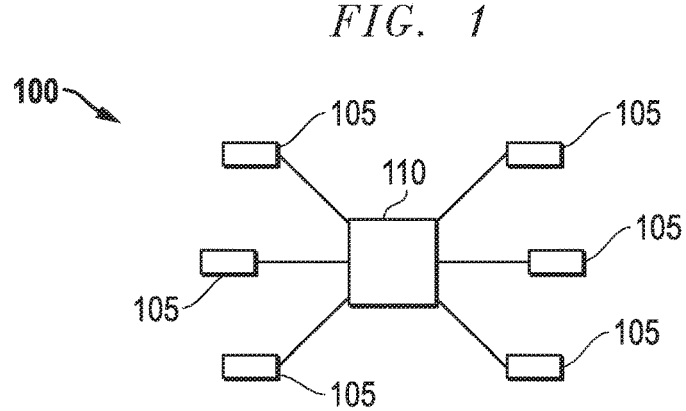
FIGS. 2A-2C illustrate exemplary local voting networks having voting devices and a controller in which the techniques disclosed herein may be utilized.
Figure 2B:
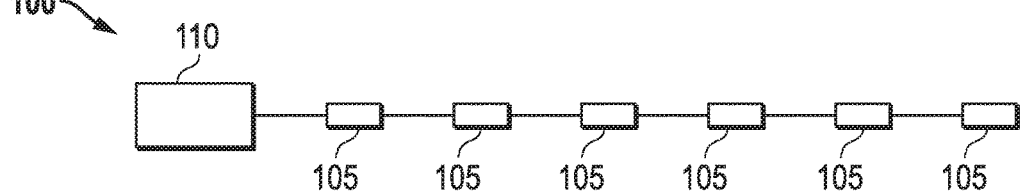
Figure 2C:
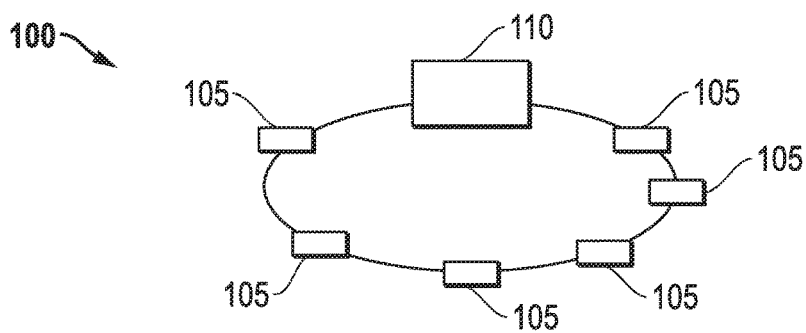

FIGS. 2A-2C illustrate exemplary network configurations, though it will be recognized that the stranded ballot techniques described herein are not limited to a particular network configuration. As shown in FIGS. 2A-2C, one or more voting devices 105 are provided. The voting devices may be DRE voting terminals, other in person voting terminals, ballot scanning voting terminals (scanners), etc. Networked to the voting devices 105 is network controller 110. The network controller 110 may take the form of one or more of a wide variety of network devices that may be used to control, monitor, and/or implement the voting process of the voting devices 105. For example, the controller may be an election judge's station or computer used at a precinct voting stations to provide ballot information to the voting devices and subsequently collect voting records from voting devices. In other embodiments, the controller may also be a server that controls the operations of voting devices. In other embodiments, the controller may be a central office computer that is network connected to one or more voting devices. As shown in FIGS. 2A-2C a star network configuration, in-line network configuration and ring network configuration are illustrated respectively. In one embodiment the network may be configured as a daisy chain network having TCP/IP protocol over Ethernet based connections, such as disclosed in U.S. patent application Ser. No. 15/229,280 entitled "System and Method For Electronic Voting Network" to Blachman, et al., the disclosure of which is expressly incorporated herein by reference. It will be recognized that other networks such as mesh networks or any other network configuration in which the controller 110 may be coupled to the voting devices 105 may be utilized. The connections between the voting devices and the controller may be formed by any of many well-known network protocols. Further, the network protocols may be hard wire or wireless protocols.

Though in exemplary embodiments described herein the network controller 110 and the voting devices may form a local area network, it will be recognized that the network need not be limited to just local networks. Thus, for example, the controller 110 need not be located proximate the voting devices 105. For example, the controller 110 may be located at a central elections office while the voting devices 105 may be spread throughout an election region. In such cases the controller 110 may be in communication with the voting devices 105 through either hard-wire communications and/or wireless communications. In yet another embodiment, the controller 110 may be implemented through a plurality of computing devices and such plurality of devices may even be spread across both local voting and central office locations. For example, the controller 110 may be implemented by a combination of a local connectivity device proximate the voting devices 105 and additional central office hardware. In such an embodiment, the local connectivity device may merely transmit communications to the additional central office computing hardware which performs the control, monitoring and/or implementation of the voting process. In yet another embodiment, the voting devices 105, controller 110 and central elections office may all be located at separate physical locations. Thus, the controller may be any of a wide variety of one or more computing and electronic devices that controls, monitors, and/or processes the voting workflow which occurs on a plurality of networked voting devices.

No matter the type of network configuration utilized, there exists the possibility of a voting device 105 generating a cast vote record (CVR) that is not properly received by the controller 110. Alternatively, the processing of a ballot may be interrupted prior to a ballot being cast. Either of such communication failures may result from a wide variety of conditions, including but not limited to loss of network connection, power outages, a faulty network "handshake," corrupted dated or any number of other procedural, technical or mechanical problems. In event of such communication failures, stranded ballots may exist in which the ballot is not properly communicated from the voting device 105 to the controller 110.

The techniques described herein provide a notification mechanism to provide alerts as to the existence of a stranded ballot. When the system determines that a ballot has been cast but not recorded at the controller or that a ballot has been interrupted prior to being cast, an alert may be issued.

The determination that a ballot has been stranded may occur in a variety of manners, and the techniques disclosed herein are not limited to a particular data transmission protocol/acknowledgement arrangement. For example, the controller may issue ballots to the voting device and the absence of receipt of a corresponding cast vote may be indicative of a stranded ballot. Alternatively, the communication protocol utilized may include acknowledgements of transmission and receipt between the voting device and the controller. When proper acknowledgements are not generated, alerts at the voting device and/or the controller may be generated. It will be recognized that other techniques may be utilized to determine the existence of a stranded ballot, and the concepts disclosed herein may be equally applicable to such other techniques.

The alerts may be provided to the voter themselves, local administrators at the network locations (for example a polling place judge) and/or remote administrators at a central election office. In response to the alert, the election administrators may then take a variety of courses of action, depending upon the particular jurisdiction's protocols. For example, the administrators may authorize continued operations without immediately recovering the stranded ballot. Alternatively, all operations on the relevant voting device may be halted. Further, automated recovery mechanisms may be provided so that the stranded ballot is transmitted to the controller when proper communication is restored between the voting device and the controller. Further, manual recovery processes may be provided that allow stranded ballot information to be added to tabulation totals. Such manual recovery processes may be the default recover process or may be implemented in situations where automated recovery cannot be used (for example hardware failure of the voting device). The techniques described herein also optionally provide for recording the occurrence of stranded ballot alerts and recording the resolution, if any, of such alerts as to the stranded ballots.

In this manner, a system is provided that provides notifications at the polling place and/or a central office of the existence of stranded ballot. The notifications of a stranded ballot ensure that election officials are aware of a stranded ballot and allow for appropriate actions to be taken. In addition, documentation of the events and resolution actions may be retained.

One voting system embodiment will be further described as an exemplary embodiment, though it will be recognized that the techniques described may be utilized with other embodiments. In this embodiment, multiple voting devices are provided in a local network which has a local controller. A typical environment for such an embodiment may be a precinct voting location. The controller may be used to provide access codes to a voter. Entering the access codes on the voting device may enable a ballot to be provided from the controller to the particular voting device. It will be recognized, however, that a ballot may be provided to a voting device via a wide range of other mechanisms and the concepts described herein are not limited to a controller which provides the ballot or a controller which provides ballot access codes. Thus, a ballot could be activated on a voting device through a variety of other techniques.

When a ballot is cast on the voting device by voter, a cast vote record is provided from the voting device through the network to the controller. The collection of cast vote records from the precinct may be stored on a local data drive connected to or part of the controller. The cast vote records may in turn ultimately be provided from the controller to the central tabulation center through manual transport of the data drives. Alternatively, networked communication may be provided from the controller to the central tabulation center so as to transmit the cast vote records.

In this exemplary embodiment, the controller may thus operate as a ballot issuing device that tracks the current state of voting sessions on the network. Further, the controller may be the device that creates the primary media that contains a record of all cast vote records sent by the networked voting devices. For example, the controller may write the data to a removable data media device (such as a removable data drive). To the extent any administrative overrides or actions are required or taken; details of such events may also be retained on the primary media. Therefore, actions described herein related to stranded ballots may be included in the primary media for subsequent review, audit or documentation at the central elections office.

The networked voting device may be a voting terminal that provides a voting mechanism to provide indicia of a voters desired election choices. The networked voting device may also operate as a device that both (1) transmits cast vote records to the controller and (2) stores a local copy at the voting device of the cast vote records. The local copy at the voting device of the data may be utilized in situations requiring stranded ballot data recovery as described herein. The voting device may also provide for the use of a mechanism to transfer the local copy of the cast vote record even in the event voting device hardware failure, such as for example, by continuously storing the voting device data on a USB data drive, memory cards, other removable memory, onboard memory, etc. In such circumstances, the voting device may store the local copy of the cast vote records on the memory device. The memory device thus operates as a local recovery media to be used in the case of a stranded ballot occurs. The voting device may be configured to include all cast vote records cast on the voting device in the recovery media or may be configured to include just the stranded ballot information in the recovery media. When a ballot has been spoiled or a ballot has been cast but not properly transferred to the controller, the voting device may warn the voter and/or the election officials. In the case of such warnings, alerts may be generated that require administrative intervention or overrides for the voting processes to proceed on the particular voting device.

In conjunction with the voting device and controller, a central tabulation system may also be provided. The central tabulation system may be used to read the primary data media, the removable data media provided from the controllers. However, the central tabulation system may also be used to read the recovery media provided from the voting devices in case of the occurrence of a stranded ballot. By comparing the cast vote records on the primary media (from the controller) with the recovery media (from the voting devices), the central tabulation system may identify stranded ballots and recover the corresponding stranded cast vote records from the recovery system. Because the occurrence of a stranded ballot may be flagged in the primary media and/or the recovery media, the central tabulation system provides an additional mechanism to identify stranded ballots. In this manner indication of a stranded ballot indication may be provided for not just at the voting device or at the controller, but also at the central tabulation system itself.

As described above, a stranded ballot may exist in which the voting process does not successfully transfer a cast vote record from the voting device to the controller. Such stranded ballots may be generally categorized as one of two broad situations. First, the voter may have successfully cast their vote but the cast vote record is not properly transmitted from the voting device to the controller. Such a first situation may be generally described as being an untransferrable ballot. It will be recognized that though the systems described herein may contemplate that the data being sent from a voting terminal to a controller is a cast vote record, an untransferrable ballot need not be a cast vote record. Thus, systems may be employed in which the data sent from a voting terminal to a controller is merely ballot data containing a voter's vote intent but is still not treated as a cast vote record. For example, a particular system may not consider the data a cast vote record until recorded at the controller or elsewhere. Thus, as used herein, the untransferrable ballot may be either a cast vote record or not.

A second category of stranded ballot may occur when the voting process was interrupted such that though a voter received a ballot (and may have even started voting), the voting process was interrupted such that a cast vote record was not generated. Such category may generally be described as being an interrupted ballot. In either an untransferrable ballot or interrupted ballot circumstance, the techniques described herein provide an alert on the voting device and/or the controller or even at the central office. The alert may take the form of a visible textual message on a screen of a hardware device, an alert light or sound, or other method of indicating to an election official and/or voter that an error has occurred.

Figure 3:
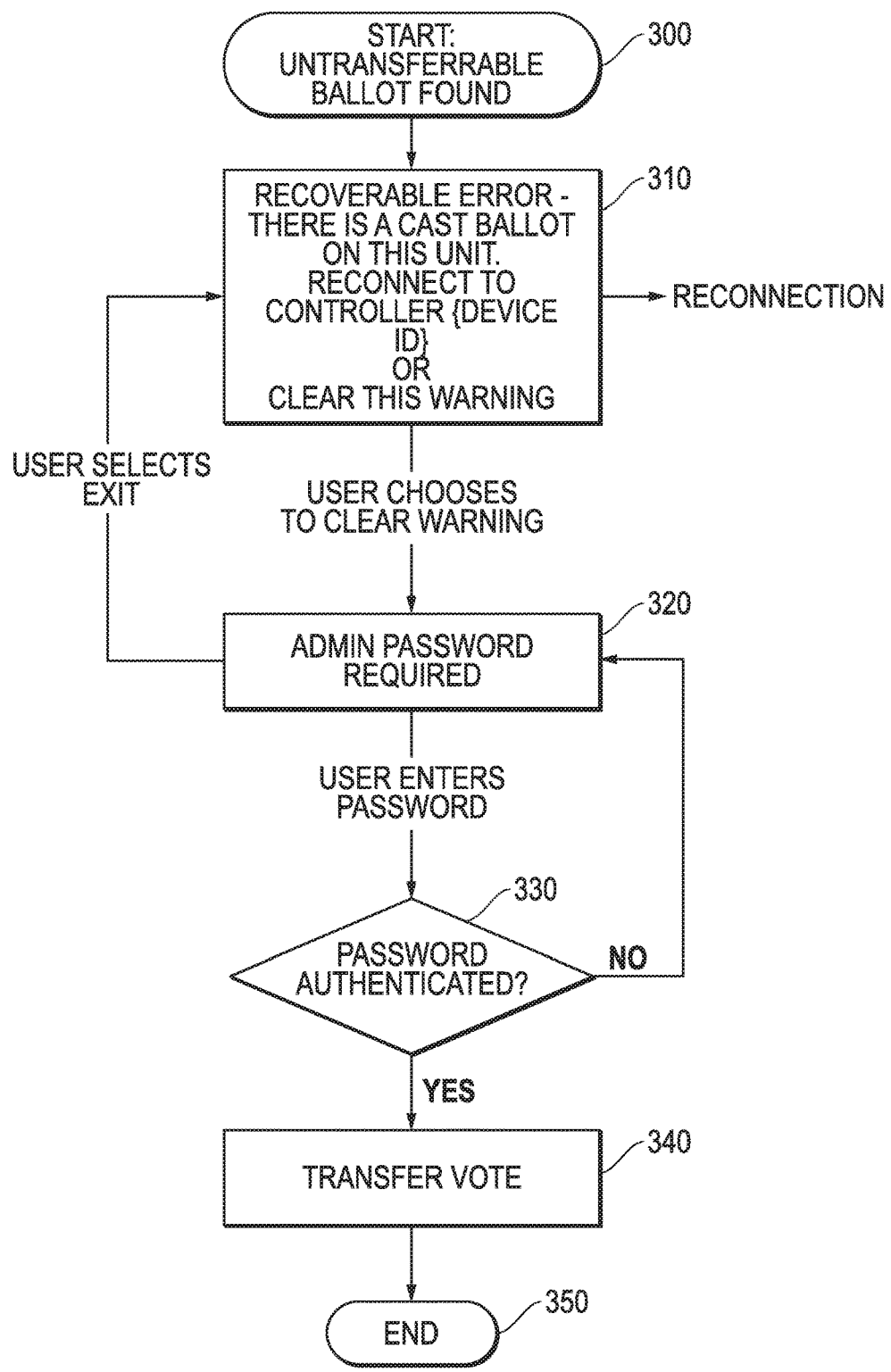
FIG. 3 illustrates an exemplary voting workflow having an alert for a stranded ballot that results from an untransferrable ballot.

An untransferrable ballot may result from a variety of reasons. For example, if a voting device and a controller become disconnected (physically or communicatively disconnected), when a voter casts a ballot the cast vote record will not be transmitted from the voting device to the controller. At that point, the voting process can be configured to immediately recognize that an untransferrable ballot exists. Alternatively, the system could be configured to provide a time period to see if reconnection is established and then only after a timeout occurs, the system would recognize that an untransferrable ballot exits. In either case, workflow may than be transferred to an untransferrable ballot workflow such as shown in FIG. 3. As shown in FIG. 3, at step 300 an untransferrable ballot has been detected. Next, at step 310 an alert is provided on the voting device. At this point, action will be needed to attend to the alert before continued use of the voting device in the voting process may occur. As shown, the alert may identify that a cast ballot exists on the voting device that has not been transferred. In the exemplary embodiment shown, two choices are provided. In one option, an attempt may be made to reconnect the voting device to the controller may occur, for example an election official could initiate a reconnection process. Such reconnection process could be as simple as connecting network wiring that has been inadvertently disconnected. Thus, in the situation of a disconnected cable an election office may take the necessary action to reconnect the system. If reconnection occurs, the cast vote record may be automatically transferred to the controller and the normal voting process may occur. Optionally, if reconnection does not occur, the untransferrable ballot alert may be dealt with through additional manual intervention. In such a situation, the election office may clear the warning and enter an administrative password at step 320. When the password is authenticated at step 330, a cast ballot record may be manually transferred from the voting device to the controller. Manual transmission may be accomplished by the manually moving a local voting device data unit (such as a USB connected drive or other memory device attached to or part of the voting device) that records the data from the voting device. The manual collection of the stranded ballot may take place in a variety of fashions. In one example, the voting device data unit may be transported to the central tabulation center. At that point, the cast vote records that were transmitted to the controller from the particular voting device may be compared to the cast vote records retained on the voting device data drive. The stranded ballot cast vote record may then be identified and added to the tabulation center voter totals. In another embodiment, the identification of the stranded ballot may occur by insertion of the voting device data unit into the controller for identification of the stranded ballot. In either, case the stranded ballot may be identified along with a record of the manual process that was utilized to retrieve the ballot. Other manual transmission techniques may be utilized as the concepts described herein are not necessarily limited to one manual transmission technique. After the voting device data unit that contains the stranded ballot is obtained, the workflow may be concluded as shown by the end step 350.

Depending upon the operational procedures of the particular jurisdiction, the voting device in question may then be taken off-line or the voting device may be subject to further analysis or attempts to reconnect the device to the network for further use in the voting process.

As described above, the untransferrable ballot workflow of FIG. 3 was entered when a voting device and controller became disconnected. However, the untransferrable ballot workflow may also be entered in other circumstances. For example, even though a voting device and a controller are connected, a data transmission error may be detected as occurring between the voting device and the controller such that the cast vote record is not received by the controller. Alternatively, it may be recognized that the data that was received at the controller was corrupted or had an error that could not be resolved automatically, such as detected through data communication protocol error detection techniques. In such circumstances, the untransferrable ballot workflow of FIG. 3 may be entered and the alert and processing techniques of FIG. 3 may be performed. In such circumstances if a satisfactory reconnection is not established, the manual transmission process may be utilized as described above.

Thus, as described herein, a variety of reasons may cause a ballot that has been cast to be stranded on a voting device. An alert is provided in such circumstances that allows for manual intervention. Though shown in FIG. 3 as being an alert provided as a message on the voting device, it will be recognized that in addition to, or in place of such an alert, an alert may be provided on the controller to accomplish the same purpose. Thus, the controller may provide an alert to the election officials that a voting device is disconnected, that a ballot is stranded on a voting device, etc. The alert provided on the controller may alternatively merely indicate that a fault has occurred in which case more details of the error may be obtained from the alert message on the voting device.

A stranded ballot may also exist before the voter casts the ballot. In such a circumstance a cast vote record has not been created before the voting process was interrupted. For example, a disconnection between a voting device and controller or other disruption of the voting process may be detected while a ballot is at a voting terminal but before the ballot is cast.

Figure 4:
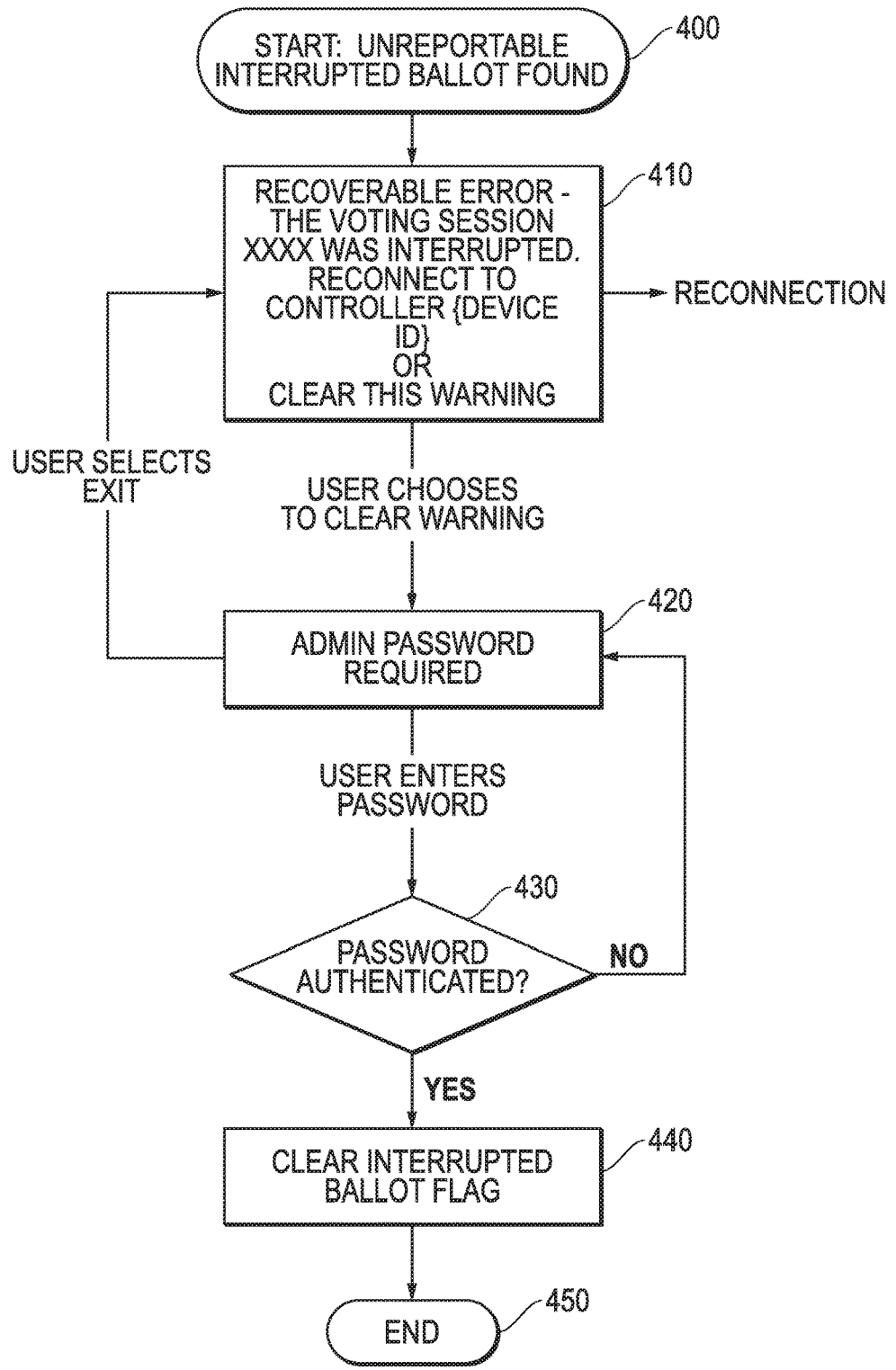
FIG. 4 illustrates an exemplary voting workflow having an alert for a stranded ballot that results from an interrupted ballot.

FIG. 4 illustrates a work flow for stranded ballots that occur in the form of an interrupted ballot. As shown in FIG. 4, after an interrupted ballot is detected at step 400, an alert 410 is provided on the voting device. At this point, action will be needed to attend to the alert before continued use of the voting device in the voting process may occur. As shown, the alert may identify that a voting session on the voting device was interrupted. In the exemplary embodiment shown, two choices are provided. In one option, an attempt may be made to reconnect the voting device to the controller, for example an election official could initiate a reconnection process. If reconnection occurs, the normal voting process may continue from the point of interruption. If reconnection does not occur, the interrupted ballot alert may be dealt with through additional manual intervention. In such a situation, the election office may begin to clear the warning by entering an administrative password at step 420. When the password is authenticated at step 430, the alert is cleared at step 440. The workflow may be concluded as shown by the end step 450. Depending upon the operation procedures of the particular jurisdiction, the voting device in question may then be taken off-line or the voting device may be subject to further analysis or attempts to reconnect the device to the network for further use in the voting process. Prior to reconnection after the alert at 410, the system may be configured to determine if the ballot that has been stranded has already been corrupted. In such case the election official may implement the appropriate process to "spoil" the interrupted ballot. The operational procedures of a jurisdiction may also be set so that when reconnection for an interrupted ballot is not successful, the election official "spoils" the ballot in question even if the system has not determined that the ballot was corrupted.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms and methods of the invention herein shown and described are to be taken as presently preferred embodiments. Equivalent techniques may be substituted for those illustrated and describe herein and certain features of the invention may be utilized independently of the use of other features, all as would be apparent to one skilled in the art after having the benefit of this description of the invention.

What is claimed is:

1. A method of configuring a network connected election voting system, comprising:
    providing one or more voting devices configured to process a voter's ballot selections;
    providing at least one voting system controller, the voting system controller configured to be network connected to the one or more voting devices, the at least one voting system controller and one or more voting devices being located at a voting location of the voter;
    configuring the network connected election voting system to detect the existence of a stranded ballot;
    configuring the network connected election voting system to provide an alert when a stranded ballot is detected, the election voting system being configured to provide the alert on at least one of the voting device or the voting system controller; and
    configuring the election voting system to halt further voting on the at least one voting device pending resolution of the alert,
    wherein the alert identifies that a ballot has been cast at the one or more voting device but not recorded at the at least one voting system controller or the ballot has been interrupted prior to being cast, the alert provided while the stranded ballot is stranded,
    wherein the alert is a visible message, light, or sound provided to an election official at the voting location or provided to the voter at the voting location,
    wherein intervention by the election official is needed to resolve the alert for further voting to proceed on the at least one voting device.

2. The method of claim 1, wherein the election voting system is configured to provide the alert on both the voting device and the voting system controller.

3. The method of claim 1, wherein the stranded ballot is an untransferrable ballot.

4. The method of claim 1, wherein the stranded ballot is an interrupted ballot.

5. The method of claim 1, wherein the voting system controller is coupled to or contains or a primary voting data media and the voting device is coupled to or contains a recovery voting data media.

6. The method of claim 5, wherein the election voting system is configured to obtain data regarding the stranded ballot by comparing the primary voting data media and the recovery voting data media.

7. The method of claim 6, wherein the election voting system is configured to provide the alert on (1) the voting device, (2) the voting system controller, or (3) both the voting device and the voting system controller.

8. The method of claim 6, wherein the election voting system is configured to perform the comparison of the primary voting data media and the recovery voting data media at a central elections office.

9. The method of claim 1, wherein the election voting system is also configured to provide the alert on a central elections office device.

10. An election voting system, comprising:
    at least one voting device configured to process a voter's ballot selections;
    at least one controller, the controller network connected to at least one voting devices the at least one controller and the at least one voting device being located at a voting location of the voter;
    the at least one voting device, the controller or both the at least one voting device and the controller being configured to detect a stranded ballot at the at least one voting device; and
    the at least one voting device, the controller or both the at least one voting device and the controller being configured to provide an alert in conjunction with the detection of the stranded ballot, the alert being configured to identify the existence of the stranded ballot,
    wherein the election voting system is configured to halt further voting on the at least one voting device pending resolution of the alert,
    wherein the alert identifies that a ballot has been cast at the at least one voting device but not recorded at the at least one controller or the ballot has been interrupted prior to being cast, the alert provided while the stranded ballot is stranded,
    wherein the alert is a visible message, light, or sound capable of being provided to an election official at the voting location or to the voter at the voting location;
    wherein the election voting system is configured to require intervention by the election official to resolve the alert for further voting to proceed on the at least one voting device.

11. The election voting system of claim 10, the at least one voting device and the at least one controller being part of a local network.

12. The election voting system of claim 11, the at least one voting device coupled to or including a recovery voting data media and the controller coupled to or including a primary voting data media.

13. The election voting system of claim 11, the recovery voting data media and the primary voting data media both being moveable media.

14. The election voting system of claim 10, the at least one voting device coupled to or including a recovery voting data media and the controller coupled to or including a primary data media.

15. The election voting system of claim 14, the recovery voting data media including data which may be used to recover the stranded ballot.

16. The election voting system of claim 10, the alert being provided in the form of a message on both the at least one voting device and the at least one controller.

17. A method of controlling the work flow of an election process, comprising:

providing at least one voting device and a controller, the at least one voting device and the controller being configured to communicate via a network the controller and the at least one voting device being located at a voting location of a voter;

configuring the voting device and the controller to communicate ballot information containing data indicating the voter's election choices from the voting device to the controller over the network;

configuring the voting process to detect when the communication of ballot information containing data indicating a voter's election choice is not properly transmitted from the at least one voting device to the controller;

configuring the voting process to provide an alert in conjunction with the detection that the data indicating a voter's election choice has not been properly transmitted from the at least one voting device to the controller, the alert being provided on a screen of the at least one voting device, the controller or both the at least one voting device and the controller; and configuring the at least one voting device to halt further voting on the at least one voting device pending resolution of the alert, wherein the alert identifies that a ballot has been cast at the at least one voting device but not recorded at the controller or the ballot has been interrupted prior to being cast, the alert provided while voter's election choice has not been properly transmitted from the at least one voting device to the controller, wherein the alert is a visible message, light, or sound provided to an election official at the voting location or provided to the voter at the voting location, wherein intervention by the election official is needed to resolve the alert for further voting to proceed on the at least one voting device.

18. The method of claim 17, the data that has not been properly transmitted being an untransferrable ballot.

19. The method of claim 18, the untransferrable ballot being a cast vote record stranded on the at least one voting device.

20. The method of claim 19, the cast vote record being recoverable by obtaining voting data from a recovery media associated with the at least one voting device.

21. The method of claim 17, the data that has not been properly transmitted being an interrupted ballot.

22. The method of claim 17, wherein the alert is also provided on a central elections office device.

\* \* \* \* \*